(12) United States Patent
Selbertinger et al.

(10) Patent No.: US 8,669,388 B2
(45) Date of Patent: Mar. 11, 2014

(54) METHOD FOR PRODUCING ORGANOSILICON COMPOUNDS HAVING AMINO GROUPS

(75) Inventors: Ernst Selbertinger, Burghausen (DE); Juergen Pfeiffer, Mehring (DE)

(73) Assignee: Wacker Chemie AG, Munich (DE)

( * ) Notice: Subject to any disclaimer, the term of this patent is extended or adjusted under 35 U.S.C. 154(b) by 263 days.

(21) Appl. No.: 13/126,284

(22) PCT Filed: Dec. 8, 2009

(86) PCT No.: PCT/EP2009/066618
§ 371 (c)(1),
(2), (4) Date: Apr. 27, 2011

(87) PCT Pub. No.: WO2010/069820
PCT Pub. Date: Jun. 24, 2010

(65) Prior Publication Data
US 2011/0301374 A1 Dec. 8, 2011

(30) Foreign Application Priority Data
Dec. 19, 2008 (DE) .......................... 10 2008 055 039

(51) Int. Cl.
*C07F 7/10* (2006.01)
(52) U.S. Cl.
USPC ............................ 556/413; 556/459; 556/462

(58) Field of Classification Search
USPC .................................. 556/412, 413, 459, 462
See application file for complete search history.

(56) References Cited

U.S. PATENT DOCUMENTS

| 5,214,119 | A | | 5/1993 | Leir et al. | |
| 5,461,134 | A | * | 10/1995 | Leir et al. | ......................... 528/14 |
| 7,074,875 | B2 | * | 7/2006 | Schindler et al. | ............... 528/38 |
| 7,491,786 | B2 | * | 2/2009 | Scheim et al. | .................. 528/38 |
| 8,329,770 | B2 | * | 12/2012 | Ziche et al. | .................... 521/130 |
| 2004/0210024 | A1 | | 10/2004 | Schafer et al. | |
| 2004/0236056 | A1 | | 11/2004 | Schindler et al. | |
| 2004/0254325 | A1 | | 12/2004 | Kuepfer et al. | |

FOREIGN PATENT DOCUMENTS

| EP | 0739372 B1 | 12/1998 |
| EP | 1412416 B1 | 9/2004 |
| EP | 1406950 B1 | 2/2005 |

* cited by examiner

*Primary Examiner* — Johann R Richter
*Assistant Examiner* — Pancham Bakshi
(74) *Attorney, Agent, or Firm* — Brooks Kushman P.C.

(57) ABSTRACT

Amino group-containing organosilicon compounds containing no or only a small fraction of Si-bonded hydroxyl groups are prepared by preparing an organosilicon compound containing amino groups and Si-bonded hydroxyl groups by equilibration in the presence of an equilibration catalyst, and reacting the resultant product with a cyclic silazane. The products are particularly useful as a monomer or macromere for the preparation of high molecular weight organic polymers containing organosilicon blocks.

20 Claims, No Drawings

METHOD FOR PRODUCING ORGANOSILICON COMPOUNDS HAVING AMINO GROUPS

CROSS-REFERENCE TO RELATED APPLICATION

This application is the U.S. national phase of PCT Appln. No. PCT/EP2009/066618 filed Dec. 8, 2009 which claims priority to German application DE 10 2008 055 039.6 filed Dec. 19, 2008.

BACKGROUND OF THE INVENTION

1 Field of the Invention

The invention relates to a process for preparing organosilicon compounds containing amino groups, these compounds containing no fraction, or a very small fraction, of silanol groups.

2 Description of the Related Art

Processes for preparing organosilicon compounds containing amino groups are already known. U.S. Pat. No. 5,461,134 describes an equilibration process for preparing aminoalkyl-terminal siloxanes having chain lengths of more than 50 silicon atoms. A catalyst used is anhydrous tetramethylammonium hydroxide-aminopropyldimethyl-silanolate. Furthermore, EP-A 739 372 describes an equilibration process for preparing aminoalkyl-terminal siloxanes having chain lengths of more than 27 silicon atoms. Catalysts used are Rb or Cs hydroxides/silanolates, which after the end of the reaction must be neutralized with acids, and the salts must be removed by filtration.

The processes known to date oftentimes have the disadvantage that, owing to the incorporation of the traces of moisture that are present, compounds with a high silanol fraction are obtained. Reducing the unwanted silanol fraction usually entails a significantly increased process cost and inconvenience.

For numerous applications of the amino-functional siloxanes, such as copolymerization with diisocyanates, acid esters, and acid chlorides, a low silanol fraction is massively important. Si—OH groups have proven particularly disadvantageous in the context of copolymerizations to form polyureas, since the Si—OH groups act as chain terminators in the subsequent poly-addition reaction with diisocyanates. The significance of this problem grows in line with increasing chain length of the polysiloxane, because the number of active end groups falls as the siloxane chain length grows.

SUMMARY OF THE INVENTION

The present invention provides amino group-containing organopolysiloxanes which contain few or no silanol groups by reacting a cyclic silazane with an organopolysiloxane containing both amino groups and silanol groups, prepared by equilibration of organopolysiloxanes bearing terminal Si—C-bonded amino groups with linear organopolysiloxanes bearing terminal Si-bonded hydroxyl groups and/or cyclosiloxanes in the presence of an equilibration catalyst.

DETAILED DESCRIPTION OF THE PREFERRED EMBODIMENTS

The invention provides a process for preparing organopolysiloxanes containing amino groups, characterized in that
(A) organosilicon compounds containing amino groups and Si-bonded hydroxyl groups, obtainable by equilibration of substantially linear organopolysiloxanes containing terminal SiC-bonded amino groups with substantially linear organopolysiloxanes containing terminal, Si-bonded hydroxyl groups, and/or cyclosiloxanes, in the presence of equilibration catalysts, are reacted with
(B) silazanes of the formula

where
W denotes hydrogen or a monovalent, optionally substituted hydrocarbon radical or organosilyl radical,
R may be identical or different and denotes a monovalent, optionally substituted hydrocarbon radical or organyloxy radical, and
X denotes a divalent, optionally substituted hydrocarbon radical which may be interrupted by oxygen or nitrogen atoms.

In the context of the present invention, the term "organopolysiloxanes" is intended to encompass polymeric, oligomeric, and dimeric siloxanes, in which some of the silicon atoms may be joined to one another by groups other than oxygen, such as via —N— or —C—, for instance.

Examples of hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, and the α- and the β-phenylethyl radicals.

Examples of substituted hydrocarbon radicals R are haloalkyl radicals such as the 3,3,3-trifluoro-n-propyl radical, the 2,2,2,2',2',2'-hexafluoroisopropyl radical, and the heptafluoroisopropyl radical, and haloaryl radicals such as the o-, m-, and p-chlorophenyl radical; alkyl radicals with ether oxygens, for example, alkoxyalkyl radicals such as the 2-methoxyethyl radical.

Examples of organyloxy radicals R are alkoxy radicals such as the methoxy, ethoxy, n-propoxy, isopropoxy, 1-n-butoxy, 2-n-butoxy, and isobutoxy radicals.

Radical R preferably comprises hydrocarbon radicals having 1 to 20 carbon atoms, more preferably the methyl or the phenyl radical.

Examples of divalent radicals X are linear or branched alkylene radicals such as the methylene, ethylene, n-propylene, isopropylene, n-butylene, isobutylene, tert-butylene, n-pentylene, isopentylene, neopentylene, tert-pentylene, hexylene, heptylene, octylene, nonylene, decylene, dodecylene, and octadecylene radicals; cycloalkylene radicals such as cyclopentylene radical; alkenylene radicals such as the vinylene, n-hexenylene, cyclohexenylene, 1-propenylene, allylene, butenylene, and 4-pentenylene radicals; alkynylene radicals such as the ethynylene and propargylene radicals; arylene radicals such as the phenylene, naphthylene, anthrylene, and phenanthrylene radicals; alkarylene radicals such as o-, m-, p-tolylene radicals, xylylene radicals, and ethylphenylene radicals; and aralkylene radicals such as the benzylene radical, and the α- and the β-phenylethylene radicals.

Examples of substituted radicals X are the aforementioned radicals in which nonadjacent methylene units have been replaced by groups —O— or =N—R', where R' has a definition stated above for R, such as, for example, —CH$_2$—CH$_2$—O—CH$_2$—, —CH$_2$—CH$_2$—NR'—CH$_2$, and also divalent hydrocarbon radicals substituted by halogen atoms, such as —CH$_2$—CH$_2$—CHCl—CH$_2$, for example.

The radical X preferably comprises divalent aliphatic radicals having 1 to 10 carbon atoms, with the 1,3-propylene radical and the 2-methyl-1,3-propylene radical being particularly preferred.

If radical W is an of organosilyl radical, the radicals are preferably of the formula

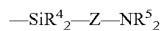  (V)

where

R$^4$ may be identical or different and has a definition indicated for R,

R$^5$ may be identical or different and denotes hydrogen or a monovalent, optionally substituted hydrocarbon radical, and Z denotes a divalent, optionally substituted hydrocarbon radical which may be interrupted by oxygen or nitrogen atoms.

Examples of radical R$^4$ are the examples indicated for R. Radical R$^4$ preferably comprises alkyl, alkenyl or aryl radicals, more preferably alkyl radicals, more particularly the methyl radical.

Examples of radical R$^5$ are the examples indicated for R for optionally substituted hydrocarbon radicals. Radical R$^5$ preferably comprises hydrogen, alkyl radicals or aryl radicals, with hydrogen atoms being particularly preferred.

Examples of Z are the examples indicated above for X. Radical Z preferably comprises linear or branched alkyl radicals, with the 1,3-n-propylene radical being particularly preferred.

Examples of W as organosilyl radical are 3-aminopropyl-dimethylsilyl, N-methyl-3-aminopropyl-dimethylsilyl, N-methyl-3-amino-2-methyl-propyl-dimethylsilyl or else the 4-aminobutyl-dimethylsilyl radical, with the 3-aminopropyl-dimethylsilyl radical being preferred.

Examples of W as monovalent, optionally substituted hydrocarbon radical are the hydrocarbon radicals stated above for radical R, and also amino alkyl radicals, such as the 2-aminoethyl the 3-aminopropyl and the 4-aminobutyl radical.

Radical W preferably comprises radicals of the formula (V), more preferably the 3-aminopropyl-dimethyl-silyl radical.

Examples of silazanes (B) used in accordance with the invention are those of the formula (IV) with X as 2-methyl-1,3-propylene radical and W as hydrogen atom or methyl radical (formula IVa)

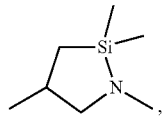  (IVa)

those of the formula (IV) with X=1,3-propylene radical and W=H (formula IVc),

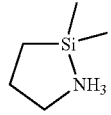  (IVb)

or those of the formula (IV) with W as SiR$^4$$_2$—Z—NR$^5$$_2$ radical (formula IVc)

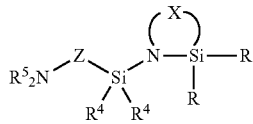

with R, R$^4$, R$^5$, X, and Z as one of the definitions stated above, such as 3-[(2,2-dimethyl-1,2-azasilolidin-1-yl)(dimethyl)silyl]-1-propanamine, for example.

The silazanes (B) used in accordance with the invention are preferably those of the formula (IV) with W as organosilyl radical, more preferably silazanes of the formula (IVc), more particularly 3-[(2,2-dimethyl-1,2-azasilolidin-1-yl)(dimethyl)silyl]-1-propanamine.

The siloxanes (A) containing amino groups and Si-bonded hydroxyl groups that are used in the process of the invention may be any desired siloxanes known to date, which are generally prepared by equilibration. These siloxanes are preferably largely linear organopolysiloxanes containing terminal, SiC-bonded amino groups and having a silanol content of 50 to 100,000 ppm by weight, preferably 50 to 50,000 ppm by weight.

The siloxanes (A) containing amino groups and Si-bonded hydroxyl groups that are used in the process of the invention have a viscosity of preferably 4 to 1,000,000 mm$^2$/s, more preferably 4 to 200 mm$^2$/s, in each case at 25° C.

The process of the invention is preferably a two-stage process characterized in that in a 1$^{st}$ stage (a1) substantially linear organopolysiloxanes containing terminal, SiC-bonded amino groups are reacted with (a2) substantially linear organopolysiloxanes containing terminal Si-bonded hydroxyl groups and/or cyclosiloxanes in the presence of equilibration catalysts, and in a 2$^{nd}$ stage the resulting organopolysiloxanes (A) containing amino groups and Si-bonded hydroxyl groups are reacted with (B) silazanes of the formula

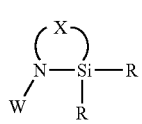  (IV)

where
W denotes hydrogen, or a monovalent, optionally substituted hydrocarbon radical or organosilyl radical,
R may be identical or different and denotes a monovalent, optionally substituted hydrocarbon radical or organyloxy radical, and
X denotes a divalent, optionally substituted hydrocarbon radical which may be interrupted by oxygen or nitrogen atoms.

The substantially linear organopolysiloxanes (a1) containing terminal amino groups are preferably siloxanes of the formula $$R^6HN\text{—}Y\text{—}[SiR^1{}_2O]_n SiR^1{}_2\text{—}Y\text{—}NHR^6 \qquad (I)$$

where
$R^1$ may be identical or different and denotes a monovalent, optionally substituted hydrocarbon radical,
$R^6$ may be identical or different and denotes hydrogen or a monovalent, optionally substituted hydrocarbon radical,
Y may be identical or different and denotes a divalent, optionally substituted hydrocarbon radical, and
n is an integer greater than or equal to 1, preferably 1 to 50.

Examples of radical $R^1$ and $R^6$ are, independently of one another, the examples indicated for R above for optionally substituted hydrocarbon radicals.

Radical $R^1$ preferably comprises hydrocarbon radicals having 1 to 20 carbon atoms, more preferably the methyl or the phenyl radical.

Radical $R^6$ preferably comprises hydrogen or hydrocarbon radicals having 1 to 20 carbon atoms, more preferably hydrogen or methyl.

Examples of radical Y are the examples indicated above for X. Y preferably comprises alkylene radicals and the phenylene radical, more preferably the methylene, propylene or phenylene radical.

Although not indicated in formula (I), up to 5 mol percent of the diorganosiloxane units may have been replaced by other siloxane units, such as $R^1SiO_{3/2}$ and $SiO_{4/2}$ units, for example, where $R^2$ has the definition indicated for it above.

Examples of siloxanes of the formula (I) are MeHN—$(CH_2)_3$—$[SiMe_2O]_{1-10}SiMe_2$-$(CH_2)_3$—NHMe, $H_2N$—$(CH_2)_3$—$SiMe_2O$—$[SiMeViO]_{1-10}$—$[SiMe_2O]_{1-10}$—$SiMe_2$-$(CH_2)_3$—$NH_2$, and $H_2N$—$(CH_2)_3$—$[SiMe_2O]_{1-10}SiMe_2$-$(CH_2)_3$—$NH_2$, where Me denotes methyl radical and Vi denotes vinyl radical.

The siloxanes of the formula (I) are preferably $H_2N$—$(CH_2)_3$—$[Si(CH_3)_2O]_{1-10}Si(CH_3)_2$—$(CH_2)_3$—$NH_2$, with $H_2N$—$(CH_2)_3$—$[Si(CH_3)_2O]Si(CH_3)_2$—$(CH_2)_3$—$NH_2$ being particularly preferred.

The siloxanes (a1) used in the 1$^{st}$ stage of the process of the invention preferably have a viscosity of 1 to 100 mm$^2$/s, more preferably 4 to 10 mm$^2$/s, in each case at 25° C.

The substantially linear organopolysiloxanes (a2) containing terminal, Si-bonded hydroxyl groups are preferably siloxanes of the formula $$OH\text{—}[SiR^2{}_2O]_m SiR^2{}_2\text{—}OH \qquad (II)$$

where
$R^2$ may be identical or different and denotes a monovalent, optionally substituted hydrocarbon radical, and
m is 0 or an integer, preferably 1 to 10,000, more preferably 10 to 100.

Examples of radical $R^2$ are the examples indicated above for R for optionally substituted hydrocarbon radicals. Radical $R^2$ preferably comprises hydrocarbon radicals having 1 to 20 carbon atoms, more preferably the methyl, the vinyl or the phenyl radical.

Although not indicated in formula (II), up to 5 mol percent of the diorganosiloxane units may have been replaced by other siloxane units, such as $R^2SiO_{3/2}$ and $SiO_{4/2}$ units, for example, where $R^2$ has the definition indicated for it above.

Examples of siloxanes of the formula (II) are OH—$[[SiMe_2O]_{10-500}$—$SiMe_2$-OH, with OH—$[SiMe_2O]_{10-200}SiMe_2$-OH being preferred and OH—$[SiMe_2O]_{15-50}SiMe_2$-OH being particularly preferred, in each case with Me as methyl radical.

The substantially linear siloxanes (a2) which can be used in the 1$^{st}$ stage of the process of the invention preferably have a viscosity of 10 to 100,000 mm$^2$/s, more preferably 10 to 500 mm$^2$/s, in each case at 25° C.

The cyclosiloxanes (a2) are preferably those of the formula $$(SiR^3{}_2O)_a \qquad (III)$$

where
$R^3$ may be identical or different and denotes a monovalent, optionally substituted hydrocarbon radical and
a is an integer greater than or equal to 3, preferably 3, 4, 5 or 6.

Examples of radical $R^3$ are the examples indicated above for R for optionally substituted hydrocarbon radicals. Radical $R^3$ preferably comprises hydrocarbon radicals having 1 to 20 carbon atoms, more preferably the methyl radical.

Although not indicated in formula (III), up to 5 mol percent of the diorganosiloxane units may have been replaced by other siloxane units, such as $R^3SiO_{3/2}$ and $SiO_{4/2}$ units, for example, where $R^3$ has the definition indicated for it above.

Examples of siloxanes of the formula (III) are hexamethylcyclotrisiloxane (D3), octamethyltetrasiloxane (D4), decamethylpentasiloxane (D5), and dodecamethylhexasiloxane (D6), phenylcyclosiloxanes, phenylmethylcyclosiloxanes, vinylcyclosiloxanes, and vinylmethylcyclosiloxanes of different ring sizes.

The cyclosiloxanes of the formula (III) are preferably octamethyltetrasiloxane (D4), decamethylpentasiloxane (D5), and dodecamethylhexasiloxane (D6), more preferably octamethyltetrasiloxane (D4) and decamethylpentasiloxane (D5).

The siloxanes (a2) used in accordance with the invention may be exclusively substantially linear organopolysiloxanes containing terminal Si-bonded hydroxyl groups or exclusively cyclosiloxanes, or may be mixtures of linear and cyclic siloxanes, with cyclosiloxanes being used preferably as component (a2).

In the 1$^{st}$ stage of the process of the invention, the proportion of siloxanes (a1) to siloxanes (a2) is guided substantially by the chain length of the desired end product. Siloxanes (a2) are used preferably in amounts of 300 to 20,000 parts by weight, more preferably 300 to 10,000 parts by weight, based in each case on 100 parts by weight of siloxane (a1).

If desired, silazanes (a3) may be used as early as in the 1$^{st}$ stage of the process of the invention, in addition to the siloxanes (a1) and (a2). In this case, the silazane is able to undergo hydrolysis to form the disiloxane and can be consumed by reaction in the course of the equilibration to form siloxane chain ends.

The silazanes (a3) used optionally may be the same silazanes which are used as component (B) in the process of the invention.

If silazane (a3) is added in the 1$^{st}$ stage of the process of the invention, this addition preferably takes place substoichiometrically or stoichiometrically with respect to the total water and OH—Si content of the siloxanes (a1) and (a2) and also of the equilibration catalyst added. In the equilibration step of the invention it is preferred to use silazane (a3).

If silazane (a3) is added in the 1$^{st}$ stage of the process of the invention, the amounts involved are with particular preference 0.1 to 20 parts by weight, more particularly 0.1 to 5 parts by weight, based in each case on 100 parts by weight of the total weight of siloxanes (a1) and (a2).

The equilibration catalysts used in accordance with the invention may be any desired equilibration catalysts, or mixtures thereof.

Examples of equilibration catalysts are alkali metal hydroxides, more particularly potassium, rubidium, and cesium hydroxide, alkali metal alcoholates, quaternary ammonium hydroxides such as tetramethylammonium hydroxide (TMAH) or its pentahydrate, tetrabutylammonium hydroxide, benzyltrimethylammonium hydroxide, benzyltriethylammonium hydroxide, and mixtures thereof as well, in the form of an aqueous or alcoholic solution, benzyltrimethylammonium butylate, β-hydroxyethyltrimethylammonium 2-ethylhexanoate, quaternary phosphonium hydroxides such as tetramethylphosphonium hydroxide, tetraethylphosphonium hydroxide, tetra-n-butylphosphonium hydroxide, and tri-n-butyl-3-[tris(trimethylsiloxy)silyl]-n-propylphosphonium hydroxide, mixtures thereof, and also their silanolates and siloxanolates; alkali metal and ammonium organosilanolates such as the potassium, rubidium, cesium, tetramethyl-, tetrabutyl-, and benzyltrimethyl-ammonium salts of aminopropyldimethylsilanol, aminomethyldimethylsilanol, aminoalkyl- or aminoarylsilanols, which can be prepared from the respective alkali metal hydroxides or ammonium hydroxides and corresponding aminosilanes, alkali siloxanolates and ammonium organosiloxanolates such as potassium, rubidium, cesium, tetramethyl-, tetrabutyl-, and benzyltrimethyl-ammonium salts of linear siloxanediols or aminosiloxanols, which can be prepared from the respective alkali metal hydroxides or ammonium hydroxides and with D-cycles, OH-siloxanes or diaminoalkylsiloxanes, and benzyltrimethylammonium ethylsiloxanolate, and phosphorus-nitrogen compounds. All catalysts may be added in anhydrous form, but also in aqueous or alcoholic solution, with preference being given to the quaternary phosphonium and ammonium hydroxides and their silanolates and siloxanolates, for example, aqueous TMAH, TMAH pentahydrate, TMAH aminopropyldimethylsilanolate, and TMAH siloxanolate, with particular preference being given to TMAH pentahydrate, TMAH aminopropyldimethylsilanolate, and TMAH siloxanolate.

In the 1$^{st}$ stage of the process of the invention, equilibration catalysts are preferably used in amounts of 0.01 to 5 parts by weight, more preferably 0.01 to 2 parts by weight, based in each case on 100 parts by weight of siloxane (a1).

The equilibration stage is preferably carried out at a temperature of 60 to 150° C., more preferably at 80 to 100° C., and under the pressure of the surrounding atmosphere, i.e., 900 to 1100 hPa.

The equilibration stage may be carried out in the presence or absence of organic solvents, preferably in the absence of organic solvents. If solvents are used, they are preferably aprotic solvents which are inert with respect to the reaction mixture.

Examples of organic solvents used optionally are benzene, toluene, xylene, dibutyl ether, tetrahydrofuran, dioxane, ethylene glycol dimethyl ether, ethylene glycol diethyl ether, dichloromethane, trichloromethane, carbon tetrachloride, heptane, isooctane, and cyclohexane.

If organic solvents are used in the 1$^{st}$ stage of the process of the invention, the amounts are preferably from up to 5 to 500 parts by weight, more preferably 10 to 50 parts by weight, based in each case on 100 parts by weight of the total weight of siloxanes (a1) and (a2).

The equilibration stage in the process of the invention is carried out preferably with very extensive exclusion of atmospheric moisture, and is preferably carried out in an inert gas atmosphere, such as nitrogen and noble gases, for example, preferably nitrogen or argon.

In the equilibration stage in the process of the invention, substantially linear organopolysiloxanes (A) containing terminal, SiC-bonded amino groups are obtained that preferably have a viscosity of 10 to 5000 mm$^2$/s, more preferably 25 to 500 mm$^2$/s, in each case at 25° C.

In the equilibration stage in the process of the invention, substantially linear organopolysiloxanes (A) containing terminal, SiC-bonded amino groups are obtained that preferably have a silanol content of 50 to 5000 ppm by weight, more preferably 100 to 1000 ppm by weight.

The silanol content of the siloxanes (A) may vary within wide ranges and is based primarily on the amount of silanol groups already present in the reactants, and also on unavoidable moisture in the reactants and in the catalysts, which gives rise, with SiOSi cleavage in the reactant, to silanol groups.

The reaction mixture obtained in the equilibration step may be worked up in accordance with any desired methods. Preferably, in this case, the equilibration catalyst is deactivated and/or removed. Any organic solvent used may be removed in whole or in part by distillation. These workup measures may also, however, take place, if desired, after a later process step.

According to one particularly preferred procedure for the process of the invention, the equilibration catalyst is deactivated after the end of the equilibration. When ammonium salts or phosphonium salts and/or their silanolates or siloxanolates are used as catalyst, the reaction mixture is preferably treated thermally, more preferably by heating at 150° C. for at least one or more hours. The pressure is lowered first after half of the thermal treatment time, preferably to 500 to 800 mbar, and is then lowered further, preferably to 0.1 to 10 mbar, with distillative removal of the elimination products of the catalysts, and of other volatile compounds. The resulting, turbid reaction mixture is subsequently filtered, it being possible for the filtration to take place, if desired, under an elevated pressure of preferably 2 to 5 bar, to give a clear, colorless liquid. If desired, the workup described may also be modified by carrying out the (pressure) filtration first and the distillation thereafter. When inorganic alkali metal hydroxides, their silanolates or siloxanolates are used as catalyst, the reaction mixture after the equilibration is neutralized with organic or inorganic acids or with $CO_2$ and the salts are subsequently filtered, it being possible for the filtration to take place, if desired, under an elevated pressure of preferably 2 to 5 bar, to give a clear, colorless liquid.

In the process of the invention, organopolysiloxanes containing amino groups and Si-bonded hydroxyl groups are reacted with silazanes of the formula (IV).

In the 2$^{nd}$ stage of the process of the invention, the silazane addition takes place preferably stoichiometrically to the water and OH—Si content of the organopolysiloxane (A) containing amino groups and Si-bonded hydroxyl groups, or in excess. With particular preference, silazane (B) is used in amounts of 0.1 to 10 parts by weight, more particularly 0.1 to 6 parts by weight, based in each case on 100 parts by weight of organopolysiloxane (A) containing amino groups and Si-bonded hydroxyl groups.

If desired, the reaction with silazanes (B) may be carried out in the presence of catalysts, for example, Brønsted or Lewis acids such as acetic acid, ammonium chloride or alcoholic hydrochloric acid.

If the $2^{nd}$ stage of the process is carried out in the presence of catalysts, the amounts are preferably 0.01 to 20 parts by weight, more preferably 0.1 to 1 part by weight, based in each case on 100 parts by weight of organopolysiloxane (A) containing amino groups and Si-bonded hydroxyl groups. In the $2^{nd}$ stage of the process of the invention it is preferred not to use catalyst.

The reaction according to the invention with silazane (B) may be carried out in the presence or absence of organic solvents. If solvents are used, they are preferably the same ones which can also be used in the equilibration stage.

If the $2^{nd}$ stage of the process of the invention is carried out in the presence of organic solvents, the amounts are preferably 5 to 500 parts by weight, more preferably 10 to 50 parts by weight, based in each case on 100 parts by weight of organopolysiloxane (A) containing amino groups and Si-bonded hydroxyl groups. In the $2^{nd}$ stage of the process of the invention it is preferred not to use organic solvent.

The reaction with silazane (B) is preferably carried out at a temperature of 25 to 90° C., more preferably of 60 to 80° C., and under the pressure of the surrounding atmosphere, i.e., 900 to 1100 hPa, and with very extensive exclusion of atmospheric moisture, preferably in an inert gas atmosphere, for example, nitrogen and noble gases, preferably nitrogen or argon.

The process of the invention may be carried out continuously, semibatchwise, and batchwise, with preference being given to the batchwise procedure.

The components used in the process of the invention may in each case comprise one kind of such a component or else a mixture of at least two kinds of a respective component.

The crude reaction mixture obtained after the reaction with silazane may be used directly in the target application and processed further, or may be worked up by any desired methods. With regard to workup, it is preferred to carry out what is called a vacuum devolatilization at temperatures of 120 to 175° C. and a pressure of 0.1 to 5 mbar, in which not only excess silazane but also all volatile compounds of low molecular mass, such as low molecular mass amino alkyl siloxanes, catalyst elimination products, low molecular mass D-cycles, for example, and also organic solvent, can be removed.

In the reaction with silazane, substantially linear organopolysiloxanes containing terminal, SiC-bonded amino groups are obtained that preferably have a viscosity of 10 to 20,000 mm$^2$/s, more preferably 10 to 5000 mm$^2$/s, in each case at 25° C.

The organopolysiloxanes prepared in accordance with the invention are preferably transparent, colorless, and odorless, and preferably have a silanol content of 0 to 100 ppm by weight, more preferably 0 to 50 ppm by weight.

The organopolysiloxanes containing terminal, SiC-bonded amino groups that are prepared in accordance with the invention preferably have amine numbers of between 160 and 0.03 mg KOH/g, particular preference being given to the preparation of organopolysiloxanes having amine numbers of between 160 and 2.0 mg KOH/g.

In the process of the invention, organopolysiloxanes are obtained in which the amount of low molecular mass organocyclosiloxanes having up to 9 silicon atoms is preferably below 1% by weight.

The organopolysiloxanes of the invention containing terminal, SiC-bonded amino groups can be used wherever aminosiloxanes are useful, for example, as pure, strictly difunctional "building blocks" in copolymerization with diisocyanates, acid esters, acid chlorides, and acid anhydrides, optionally in a mixture with organic diamines or diols as chain extenders. The copolymers thus prepared may serve as a plastics additive or may be processed as 100% material to form highly optically transparent, elastic films or components. Films of this kind may be put to uses including elastic, light-transmissive, and optically transparent adhesive bonds of mineral or organic glasses with natural stone or photovoltaic cells. Furthermore, copolymers of this kind possess outstanding release properties. Moreover, they can be reacted with epoxides to form innovative materials. All of these copolymer applications require a high degree of difunctionality in order to achieve the high degrees of polymerization that are vital for good target properties on the part of the copolymers.

The process of the invention has the advantage that it is very simple to carry out and the chain length can be adjusted in a targeted way. The process of the invention has the advantage, furthermore, that, with product compositions whose reproducibility is very good, it yields preferably completely silanol-free and water-free products, independently of the silanol contents and water contents of the reactants used.

The process of the invention has the advantage that readily available technical raw materials are used and there is no need for costly and inconvenient drying and purification steps of all of the reactants at the beginning of the preparation, nor for a careful, water-free reaction regime.

A further advantage of the process of the invention lies in the preferably short reaction times in conjunction with a variable reaction regime.

The process of the invention has the advantage that the molecular weight distribution of the organopolysiloxanes can be consistently reproduced.

The siloxanes prepared by the process of the invention have the advantage that they are outstandingly suitable for use as "building blocks" in copolymers where reproducible, consistent product properties with a high degree of functionality are important.

In the examples below, all parts and percentages data, unless otherwise indicated, are given by weight. Unless indicated otherwise, the examples below are carried out under the pressure of the surrounding atmosphere, in other words at about 1000 hPa, and at room temperature, in other words at about 20° C., or at a temperature which comes about when the reactants are combined at room temperature without additional heating or cooling. All of the viscosity data cited in the examples are to be based on a temperature of 25° C.

Preparation of Anhydrous Tetramethylammonium 3-aminopropyldimethylsilanolate

A 250 ml three-neck round-bottom flask equipped with a magnetic stirrer, argon inlet, and condenser with drying tube was charged with 12.4 g (0.05 mol) of 1,3-bis(3-aminopropyl)tetramethyldisiloxane, 18.1 (88.12 mmol) of tetramethylammonium hydroxide pentahydrate, and 30 ml of tetrahydrofuran. The mixture was heated under reflux in an inert gas atmosphere for 5 hours.

In the course of slow cooling, a white, crystalline precipitate emerged from the yellow-brown mother liquor. The flask was placed in an ice bath and the solid was subsequently isolated by filtration with suction. This gave a colorless solid, which was dried for 5 hours under a pressure of 0.1 mbar. It was subsequently recrystallized from anhydrous THF and isolated by suction filtration on a Schlenk frit under inert gas.

The hygroscopic product was stored at room temperature in a desiccator over blue indicator gel under argon.

EXAMPLE 1

A 1000 ml three-neck round-bottom flask with internal thermometer, mechanical stirrer, dropping funnel, and inert gas inlet was charged with 600 g (=4.73 mol) of octamethylcyclotetrasiloxane, 55.86 g (=0.22 mmol) of bis(3-aminopropyl)tetramethyldisiloxane, and 0.6 g (=3.3 mmol) of tetramethylammonium hydroxide pentahydrate. The contents of the flask were heated with an oil bath at 80° C. for 12 hours with stirring and under argon as inert gas.

An Si-29-NMR of the mixture showed that the bis(3-aminopropyl)tetramethyldisiloxane had undergone 98% conversion. The amount of cyclosiloxanes in the reaction mixture was approximately 15% of the initial amount.

The batch was then heated to 150° C. and stirred at that temperature for half an hour. Then, slowly and cautiously, a vacuum of 800 hPa was applied and volatile fractions were distilled off with slow reduction in pressure to 10 hPa. The batch was then cooled to room temperature and filtered at a pressure of 2 bar. Aminosiloxanes were obtained which had a viscosity of 50 mm$^2$/s and a silanol content of 940 ppm by weight.

Subsequently, 20 g (=87 mmol) of 3-[(2,2-dimethyl-1,2-azasilolidin-1-yl)(dimethyl)silyl]-1-propanamine (azacycle) were added to the batch, which was heated at 80° C. for 30 minutes. The contents of the flask were then devolatilized in a short-path evaporator at 170° C. under a pressure of 1 mbar.

This gave 552 g of clear, colorless oil (84% of the theoretical yield). The molecular mass of the product, determined by Si-29-NMR, was 2854 g/mol (an average of 17.6 Si units). The silanol group content was 15 ppm by weight.

EXAMPLE 2

The procedure described in example 1 is repeated with the modification that, instead of 55.86 g of bis(3-aminopropyl)tetramethyldisiloxane, 167.58 (=0.67 mol) of bis(3-aminopropyl)tetramethyldisiloxane were used.

This gave 631 g of clear, colorless oil (82% of the theoretical yield). The molecular mass of the product, determined by Si-29-NMR, was 1016 g/mol (an average of 12.6 Si units). The silanol group content was 34 ppm by weight.

EXAMPLE 3

A 1000 ml three-neck round-bottom flask with internal thermometer, mechanical stirrer, dropping funnel, and inert gas inlet was charged with 31 g (=0.104 mol) of octamethylcyclotetrasiloxane, 6.41 g (=0.026 mol) of bis(3-aminopropyl)tetramethyldisiloxane, and 0.6 g (=3.3 mmol) of tetramethylammonium hydroxide pentahydrate. The contents of the flask were heated with an oil bath at 80° C. for 2 hours with stirring and under argon as inert gas, in the course of which a marked turbidification occurred. Subsequently, a further 569 g (=1.92 mol) of octamethylcyclotetrasiloxane and 0.6 g (=3.3 mmol) of tetramethylammonium hydroxide pentahydrate were added and the batch was heated at 80° C. with stirring for 6 hours more.

An Si-29-NMR of the mixture showed that the bis(3-aminopropyl)tetramethyldisiloxane had undergone 95% conversion. The amount of cyclosiloxanes in the reaction mixture was approximately 10% of the initial amount.

The batch was then heated to 150° C. and stirred at that temperature for half an hour. Then, slowly and cautiously, a vacuum of 800 hPa was applied and volatile fractions were distilled off with slow reduction in pressure to 10 mbar. The batch was then cooled to room temperature and filtered at a pressure of 2 bar. Aminosiloxanes were obtained which had a viscosity of approximately 1000 mm$^2$/s and a silanol content of 1073 ppm by weight.

Subsequently, 20 g (=87 mmol) of 3-[(2,2-dimethyl-1,2-azasilolidin-1-yl)(dimethyl)silyl]-1-propanamine (azacycle) were added to the batch, which has heated at 80° C. for two hours. The contents of the flask were then devolatilized in a short-path evaporator at 170° C. under a pressure of 1 mbar.

This gave 530 g of clear, colorless oil (87% of the theoretical yield). The molecular mass of the product, determined by Si-29-NMR, was 21,600 g/mol (an average of 289 silicon units). The silanol group content was 8 ppm by weight.

COMPARATIVE EXAMPLE 1

First of all, octamethylcyclotetrasiloxane and bis(3-aminopropyl)tetramethyldisiloxane were subjected to fractional distillation on a Vigreux column.

A 1000 ml three-neck round-bottom flask with internal thermometer, mechanical stirrer, dropping funnel, and inert gas inlet was charged with 31 g (=0.104 mol) of octamethylcyclotetrasiloxane, 6.41 g (=0.026 mol) of bis(3-aminopropyl)tetramethyldisiloxane, and 0.05 g (=0.24 mmol) of tetramethylammonium aminopropyldimethylsilanolate. The turbid contents of the flask were heated with an oil bath at 80° C. for 12 hours with stirring and under argon as inert gas. Subsequently, a further 569 g (=1.92 mol) of octamethylcyclotetrasiloxane were added and the batch was heated at 80° C. with stirring for 12 hours more.

An Si-29-NMR of the mixture showed that the bis(3-aminopropyl)tetramethyldisiloxane had undergone 95% conversion. The amount of cyclosiloxanes in the reaction mixture was approximately 12% of the initial amount.

The batch was then heated to 150° C. and stirred at that temperature for half an hour. Then, slowly and cautiously, a vacuum of 800 mbar was applied and volatile fractions were distilled off with slow reduction in pressure to 10 mbar. The batch was then cooled to room temperature and filtered at a pressure of 2 bar. Aminosiloxanes were obtained which had a viscosity of 1000 mm$^2$/s and a silanol content of 123 ppm by weight.

The contents of the flask were then devolatilized in a short-path evaporator at 170° C. under a pressure of 1 mbar.

This gave 490 g of clear, colorless oil (81% of the theoretical yield). The molecular mass of the product, determined by Si-29-NMR, was 19,800 g/mol (an average of 267 silicon units). The silanol group content was 145 ppm by weight.

EXAMPLE 4

In a 1000 ml three-neck round-bottom flask with internal thermometer, mechanical stirrer, dropping funnel, and inert gas inlet, 139 g (49.1 mmol) of α,β-dihydroxypolydiorganosiloxane having an average chain length of 38 Si units with an OH—Si content of approximately 12,000 ppm by weight and a water content of 1540 ppm by weight and 108.30 g (365 mmol) of cyclooctamethyltetrasiloxane, 34 g (137 mmol) of bis(3-aminopropyl)tetramethyldisiloxane, 15.8 g (68.5 mmol) of 3-[(2,2-dimethyl-1,2-azasilolidin-1-yl)(dimethyl) silyl]-1-propanamine), 0.6 g (3.3 mmol) of TMAH pentahydrate were combined and heated for 6 hours with an oil bath at 80° C. with stirring and under argon as inert gas. After a few minutes, the batch became turbid.

After a stirring time of 2 hours, additionally 300 g of D4-cycles and a further 0.6 g (=3.3 mmol) of TMAH pentahydrate were added and the batch was stirred at 80° C. for a further 6 hours.

An Si-29-NMR of the mixture showed that the bis(3-aminopropyl)tetramethyldisiloxane had undergone 95% conversion. The amount of cyclosiloxanes in the reaction mixture was approximately 12% of the initial amount.

The batch was then heated to 150° C. under atmospheric pressure and stirred at that temperature for half an hour. Then, slowly and cautiously, a vacuum of 800 mbar was applied and volatile fractions were distilled off with slow increase in pressure to 10 mbar. The batch was then cooled to room temperature and filtered at a pressure of 2 bar. Aminosiloxanes were obtained which had a viscosity of 50 mm$^2$/s and a silanol content of 45 ppm by weight.

Subsequently, 20 g (=87 mmol) of 3-[(2,2-dimethyl-1,2-azasilolidin-1-yl)(dimethyl)silyl]-1-propanamine (azacycle) were added to the batch, which was heated at 80° C. for two hours. The contents of the flask were then devolatilized in a short-path evaporator at 170° C. under a pressure of 1 mbar.

This gave 480 g of clear, colorless oil (80% of the theoretical yield). The molecular mass of the product, determined by Si-29-NMR, was 2454 g/mol (an average of 32 Si units). The silanol group content was 5 ppm by weight.

EXAMPLE 5

A 1000 ml three-neck round-bottom flask with internal thermometer, mechanical stirrer, dropping funnel, and inert gas inlet was charged with a mixture of 20.3 g (7.16 mmol) of α,β-dihydroxypolydiorganosiloxane having an average chain length of 38 Si units with an OH—Si content of approximately 12,000 ppm by weight and a water content of 1540 ppm by weight, 11.78 g (39.8 mmol) of cyclooctamethyltetrasiloxane, 4.42 g (17.8 mmol) of bis(3-aminopropyl)tetramethyldisiloxane, 2.05 g (8.9 mmol) of 3-[(2,2-dimethyl-1,2-azasilolidin-1-yl)(dimethyl)silyl]-1-propanamine), 1 g (4.9 mmol) of anhydrous tetramethylammonium 3-aminopropyldimethylsilanolate and heated for 2 hours with an oil bath at 80° C. with stirring and under argon as inert gas. Subsequently, a further 561 g (=1.89 mol) of octamethylcyclotetrasiloxane and 1 g (4.9 mmol) of anhydrous tetramethylammonium 3-aminopropyldimethylsilanolate were added and the batch was heated at 80° C. with stirring for 6 hours more.

An Si-29-NMR of the mixture showed that the bis(3-aminopropyl)tetramethyldisiloxane had undergone 95% conversion and the 3-[(2,2-dimethyl-1,2-azasilolidin-1-yl)(dimethyl)silyl]-1-propanamine) had undergone complete conversion. The amount of cyclosiloxanes in the reaction mixture was approximately 10% of the initial amount.

The batch was then heated to 150° C. under atmospheric pressure and stirred at that temperature for half an hour. Then, slowly and cautiously, a vacuum of 800 mbar was applied and volatile fractions were distilled off with slow increase in the vacuum to 10 mbar. The batch was then cooled to room temperature and filtered at a pressure of 2 bar. Aminosiloxanes were obtained which had a viscosity of approximately 1000 mm$^2$/s and a silanol content of 22 ppm by weight.

Subsequently, 10 g (=48 mmol) of 3-[(2,2-dimethyl-1,2-azasilolidin-1-yl)(dimethyl)silyl]-1-propanamine were added, which was heated at 80° C. for two hours. The contents of the flask were then devolatilized in a short-path evaporator at 170° C. under a pressure of 1 mbar.

This gave 475 g of clear, colorless oil (79% of the theoretical yield). The molecular mass of the product, determined by Si-29-NMR, was 22,605 g/mol (an average of 304 Si units). The silanol group content was 15 ppm by weight.

EXAMPLE 6

The procedure described in example 1 was repeated, with the change that the equilibration was carried out at a temperature of 110° C. and under a pressure of 300 mbar, with continuous removal of volatile fractions from the mixture, using a distillation bridge, and the reaction with 3-[(2,2-dimethyl-1,2-azasilolidin-1-yl)(dimethyl)silyl]-1-propanamine took place prior to the pressure filtration at 2 bar and with addition of 50 mg of anhydrous NH$_4$Cl.

This gave 575 g of a clear, colorless oil (85% of the theoretical yield). The molecular mass of the product as determined by Si-29-NMR was 2731 g/mol (an average of 35.7 Si units). The silanol group content was 3 ppm by weight.

In the NMR there were no MeOSi groups detectable, where Me is methyl group.

EXAMPLE 7

The procedure described in example 2 was repeated, with the change that the equilibration was carried out at a temperature of 110° C. and under a pressure of 300 mbar, with continuous removal of volatile fractions from the mixture, using a distillation bridge, and the reaction with 3-[(2,2-dimethyl-1,2-azasilolidin-1-yl)(dimethyl)silyl]-1-propanamine took place prior to the pressure filtration at 2 bar and with addition of 50 mg of anhydrous NH$_4$Cl.

This gave 654 g of a clear, colorless oil (83% of the theoretical yield). The molecular mass of the product as determined by Si-29-NMR was 1073 g/mol (an average of 13.0 Si units). The silanol group content was 4 ppm by weight.

In the NMR there were no MeOSi groups detectable, where Me is methyl group.

EXAMPLE 8

The procedure described in example 3 was repeated, with the change that the equilibration was carried out at a temperature of 110° C. and under a pressure of 300 mbar, with continuous removal of volatile fractions from the mixture, using a distillation bridge, and the reaction with 3-[(2,2-dimethyl-1,2-azasilolidin-1-yl)(dimethyl)silyl]-1-propanamine took place prior to the pressure filtration at 2 bar and with addition of 50 mg of anhydrous NH$_4$Cl.

This gave 520 g of a clear, colorless oil (83% of the theoretical yield). The molecular mass of the product as determined by Si-29-NMR was 20,950 g/mol (an average of 281.4 Si units). The silanol group content was 11 ppm by weight.

In the NMR there were no MeOSi groups detectable, where Me is methyl group.

EXAMPLE 9

The procedure described in example 6 was repeated, with the change that, instead of 600 g of octamethylcyclotetrasiloxane, 600 g of α,ω-dihydroxypolydiorganosiloxane having an average chain length of 29.3 Si units with an OH—Si content of approximately 15,500 ppm and a water content of 140 ppm were used.

This gave 548 g of a clear, colorless oil (81% of the theoretical yield). The molecular mass of the product as determined by Si-29-NMR was 2762 g/mol (an average of 35.9 Si units). The silanol group content was 6 ppm by weight.

In the NMR there were no MeOSi groups detectable, where Me is methyl group.

EXAMPLE 10

The procedure described in example 8 was repeated, with the change that, instead of 31 g of octamethylcyclotetrasiloxane, 31 g of α,ω-dihydroxypolydiorganosiloxane having an average chain length of 29.3 Si units with an OH—Si content of approximately 15,500 ppm and a water content of 140 ppm were used.

This gave 515 g of a clear, colorless oil (82% of the theoretical yield). The molecular mass of the product as determined by Si-29-NMR was 22,397 g/mol (an average of 298.7 Si units). The silanol group content was 2 ppm by weight.

In the NMR there were no MeOSi groups detectable, where Me is methyl group.

EXAMPLE 11

A 2000 ml three-neck round-bottom flask with internal thermometer, mechanical stirrer, dropping funnel, and inert gas inlet was charged with 369 g (169 mmol) of α,ω-dihydroxypolydiorganosiloxane having an average chain length of 29 Si units, an OH—Si content of approximately 15,540 ppm by weight, and a water content of 140 ppm by weight.

Added to this initial charge were 115.2 g of distillate from the SPE devolatilization of similar equilibration batches, this distillate consisting, according to NMR analysis, of a mixture of
- 73.8 g (0.3 mol) of bis(3-aminopropyl)tetramethyldisiloxane,
- 32.8 g (0.44 mol) of a mixture of cyclic methylsiloxanes containing predominantly D4-D6 cycles, and
- 8.6 g (0.037 mol) of 3-[(2,2-dimethyl-1,2-azasilolidin-1-yl)(dimethyl)silyl]-1-propanamine.

Following addition of 50 mg of anhydrous $NH_4Cl$, the batch was heated at 80° C. for 30 minutes with an oil bath and with stirring, under argon as inert gas.

The dropping funnel was replaced by a distillation bridge. 1 g (5.5 mmol) of TMAH pentahydrate was added and the batch was heated with an oil bath at 110° C. for 2 hours under a pressure of 300 mbar and with stirring. The apparatus was subsequently brought to atmospheric pressure with argon, 515 g (0.24 mol) of α,ω-dihydroxypolydiorganosiloxane and 1 g (5.5 mmol) of TMAH pentahydrate were added, and the mixture was heated at 110° C. with an oil bath for 2 hours under a pressure of 300 mbar and with stirring.

The apparatus was brought to atmospheric pressure using argon as inert gas and was heated at 150° C. for 30 minutes with stirring. Then, slowly and cautiously, a pressure of 800 mbar was applied and, with slow reduction in the pressure to 10 mbar, volatile fractions were removed by distillation. The distillates produced were discarded.

The apparatus was brought to atmospheric pressure with argon as inert gas and was cooled to 80° C. Then 50 mg (0.93 mmol) of anhydrous $NH_4Cl$ and also 20 g (87 mmol) of 3-[(2,2-dimethyl-1,2-azasilolidin-1-yl)(dimethyl)silyl]-1-propanamine were added and the mixture was stirred at this temperature for 30 minutes.

It was subsequently cooled to room temperature and filtered at a pressure of 2 bar.

The filtrate was devolatilized under a pressure of 1 mbar and at 170° C. in a short-path evaporator (SPE).

This gave 846 g of a clear, colorless oil, (83% of the theoretical yield). The molecular mass of the product as determined by Si-29-NMR was 2943 g/mol (an average of 38.6 Si units). The silanol group content was 6 ppm by weight.

In the Si-29-NMR, there were no MeOSi groups detectable, where Me is methyl group.

The distillate from the SPE devolatilzation was collected and was used again in batches carried out analogously.

EXAMPLE 12

Example 11 was repeated, with the change that the total amount of α,ω-dihydroxypolydiorganosiloxane (884 g=2.48 mol) was added at the beginning of the reaction in one portion to the distillate from the SPE devolatilization. Following addition of 50 mg (0.93 mmol) of anhydrous $NH_4Cl$, the mixture was heated at 80° C. with an oil bath for 30 minutes with stirring and under argon as inert gas.

The dropping funnel was then replaced by a distillation bridge, 2 g (11 mmol) of TMAH pentahydrate were added, and the batch was heated at 110° C. with an oil bath for 2 hours under a pressure of 300 mbar and with stirring.

This gave 806 g of a clear, colorless oil, (78% of the theoretical yield). The molecular mass of the product as determined by Si-29-NMR was 3046 g/mol (an average of 40 Si units). The silanol group content was 9 ppm by weight.

In the Si-29-NMR, there were no MeOSi groups detectable, where Me is methyl group.

The distillate from the SPE devolatilzation was collected and was used again in batches carried out analogously.

EXAMPLE 13

The batch according to example 11 was repeated, with the change that the amounts of α,ω-dihydroxypolydiorganosiloxane added were 184 g (84 mmol) and 758 g (0.424 mol). The amount of devolatilization distillate added was 57.5 g. The distillate composition was analyzed by means of NMR, and the distillate consisted of a mixture of
- 36.82 g (148 mmol) of bis(3-aminopropyl)tetramethyldisiloxane,
- 16.35 g (219 mmol) of a mixture of cyclic methylsiloxanes containing predominantly D4-D6 cycles, and
- 4.29 g (18 mmol) of 3-[(2,2-dimethyl-1,2-azasilolidin-1-yl)(dimethyl)silyl]-1-propanamine.

This gave 865 g of a clear, colorless oil, (85% of the theoretical yield). The molecular mass of the product as determined by Si-29-NMR was 5913 g/mol (an average of 78.6 Si units). The silanol group content was 0 ppm by weight.

In the Si-29-NMR, there were no MeOSi groups detectable, where Me is methyl group.

The distillate from the SPE devolatilzation was collected and was used again in batches carried out analogously.

EXAMPLE 14

The batch according to example 11 was repeated, with the change that the amounts of α,ω-dihydroxypolydiorganosiloxane added were 55.3 g (25 mmol) and 927 g (0.424 mol). The amount of devolatilization distillate added was 17.25 g. Its composition was analyzed by means of NMR. It consisted of a mixture of
- 11.05 g (44 mmol) of bis(3-aminopropyl)tetramethyldisiloxane,
- 4.91 g (66 mmol) of a mixture of cyclic methylsiloxanes containing predominantly D4-D6 cycles, and
- 1.29 g (5.6 mmol) of 3-[(2,2-dimethyl-1,2-azasilolidin-1-yl)(dimethyl)silyl]-1-propanamine.

This gave 877 g of a clear, colorless oil, (86% of the theoretical yield). The molecular mass of the product as determined by Si-29-NMR was 19,930 g/mol (an average of 268 Si units). The silanol group content was 13 ppm by weight.

In the Si-29-NMR, there were no MeOSi groups detectable, where Me is methyl group.

The distillate from the SPE devolatilzation was collected and was used again in batches carried out analogously.

EXAMPLE 15

A 4000 ml three-neck round-bottom flask with internal thermometer, mechanical stirrer, dropping funnel, reflux condenser, and inert gas inlet was charged with 1236 g (0.530 mol) of α,ω-dihydroxypolydiorganosiloxane having an average chain length of 31 siloxane units, an OH—Si content of approximately 14570 ppm by weight, and a water content of 250 ppm by weight, 255.5 g (1.7347 mol) of 3-(methoxydimethylsilyl)propylamine, and 50 mg (0.93 mmol) of anhydrous NH$_4$Cl.

Added dropwise to this initial charge were 50 ml (2.78 mol) of distilled water.

This was followed by heating at 80° C. with an oil bath for 10 minutes with stirring and under argon as inert gas.

The dropping funnel was replaced by a distillation bridge. 8 g (22 mmol) of TMAH pentahydrate was added and the batch was heated to 110° C. with an oil bath. In parallel, the pressure was lowered gradually to 300 mbar, and stirring was carried out under these conditions for 2 hours.

The apparatus was subsequently brought to atmospheric pressure with argon, 1508 g (0.646 mol) of α,ω-dihydroxypolydiorganosiloxane and 4 g (11 mmol) of TMAH pentahydrate were added, and the mixture was heated at 110° C. with an oil bath for 2 hours more under a pressure of 300 mbar and with stirring. The distillate obtained in this procedure was discarded.

The apparatus was brought to atmospheric pressure using argon as inert gas and was heated at 150° C. for 30 minutes with stirring. Then, slowly and cautiously, a pressure of 800 mbar was applied and, with slow reduction in the pressure to 10 mbar, volatile fractions were removed by distillation. All of the distillates produced so far were discarded. 2494 g of an oil were obtained.

The apparatus was brought to atmospheric pressure with argon as inert gas and was cooled to 80° C. Then 50 mg (0.93 mmol) of anhydrous NH$_4$Cl and also 20 g (=87 mmol) of 3-[(2,2-dimethyl-1,2-azasilolidin-1-yl)(dimethyl)silyl]-1-propanamine were added and the mixture was stirred at this temperature for 30 minutes. It was subsequently cooled to room temperature and filtered at a pressure of 2 bar.

The clear, colorless filtrate was devolatilized under a pressure of 1 mbar and at 170° C. in a short-path evaporator (SPE).

This gave 2420 g of a clear, colorless oil, (77% of the theoretical yield). The molecular mass of the product as determined by Si-29-NMR was 3234 g/mol (an average of 42 Si units). The silanol group content was 10 ppm by weight.

In the Si-29-NMR, there were no MeOSi groups detectable, where Me is methyl group.

The distillate from the SPE devolatilzation was collected and was used again in batches carried out analogously.

The invention claimed is:

1. A process for preparing organopolysiloxanes containing amino groups, comprising reacting
   (A) organosilicon compounds containing amino groups and Si-bonded hydroxyl groups, obtained by equilibration of substantially linear organopolysiloxanes containing terminal SiC-bonded amino groups with substantially linear organopolysiloxanes containing terminal Si-bonded hydroxyl groups and/or with cyclosiloxanes, in the presence of an equilibration catalyst, with:
(B) silazanes of the formula

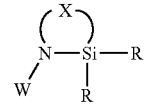

(IV)

in the presence of a Lewis acid or a Brønsted acid catalyst
where
W is hydrogen or a monovalent, optionally substituted hydrocarbon radical or organosilyl radical,
R are identical or different and are monovalent, optionally substituted hydrocarbon radicals or organyloxy radicals, and
X is a divalent, optionally substituted hydrocarbon radical optionally interrupted by oxygen or nitrogen atoms.

2. The process of claim 1, wherein radical W comprises organosilyl radicals of the formula

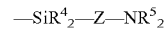

(V)

where
$R^4$ each independently has a definition indicated for R,
$R^5$ each independently is hydrogen or a monovalent, optionally substituted hydrocarbon radical, and
Z is a divalent, optionally substituted hydrocarbon radical optionally interrupted by oxygen or nitrogen atoms.

3. The process of claim 1, wherein
in a $1^{st}$ stage
(a1) substantially linear organopolysiloxanes containing terminal, SiC-bonded amino groups
are reacted with
(a2) substantially linear organopolysiloxanes containing terminal Si-bonded hydroxyl groups
and/or cyclosiloxanes
in the presence of an equilibration catalyst, to form an organopolysiloxane (A) containing amino groups and Si-bonded hydroxyl groups, and
in a $2^{nd}$ stage
the organopolysiloxane (A) containing amino groups and Si-bonded hydroxyl groups is reacted with
(B) at least one silazane of the formula

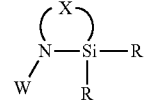

(IV)

where
W is hydrogen or a monovalent, optionally substituted hydrocarbon radical or organosilyl radical,
R each independently is a monovalent, optionally substituted hydrocarbon radical or organyloxy radical, and
X is a divalent, optionally substituted hydrocarbon radical optionally interrupted by oxygen or nitrogen atoms.

4. The process of claim 2, wherein
in a $1^{st}$ stage
(a1) substantially linear organopolysiloxanes containing terminal, SiC-bonded amino groups are reacted with (a2) substantially linear organopolysiloxanes containing terminal Si-bonded hydroxyl groups and/or cyclosiloxanes in the presence of an equilibration catalyst, to form an organopolysiloxane (A) containing amino groups and Si-bonded hydroxyl groups, and in a $2^{nd}$ stage the organopolysiloxane (A) containing amino groups and Si-bonded hydroxyl groups is reacted with (B) at least one silazane of the formula

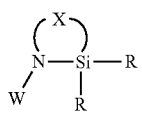

(IV)

where

W is hydrogen or a monovalent, optionally substituted hydrocarbon radical or organosilyl radical, R each independently is a monovalent, optionally substituted hydrocarbon radical or organyloxy radical, and X is a divalent, optionally substituted hydrocarbon radical optionally interrupted by oxygen or nitrogen atoms.

5. The process of claim 3, wherein a silazane (a3) is present in the $1^{st}$ stage in addition to siloxanes (a1) and (a2).

6. The process of claim 5, wherein the silazane (a3) is present in an amount of 0.1 to 20 parts by weight, based on 100 parts by weight of the total weight of siloxanes (a1) and (a2).

7. The process of claim 5, wherein the silazane (a3) is present in an amount of 0.1 to 5 parts by weight, based on 100 parts by weight of the total weight of siloxanes (a1) and (a2).

8. The process of claim 3, wherein the substantially linear organopolysiloxanes (a1) containing terminal amino groups are siloxanes of the formula $R^6HN-Y-[SiR^1_2O]_nSiR^1_2-Y-NHR^6$ (I)

where $R^1$ each is identical or different and is a monovalent, optionally substituted hydrocarbon radical, $R^6$ each is identical or different and is hydrogen or a monovalent, optionally substituted hydrocarbon radical, Y each is identical or different and is a divalent, optionally substituted hydrocarbon radical, and n is an integer greater than or equal to 1.

9. The process of claim 5, wherein the substantially linear organopolysiloxanes (a1) containing terminal amino groups are siloxanes of the formula $R^6HN-Y-[SiR^1_2O]_nSiR^1_2-Y-NHR^6$ (I)

where $R^1$ each is identical or different and is a monovalent, optionally substituted hydrocarbon radical, $R^6$ each is identical or different and is hydrogen or a monovalent, optionally substituted hydrocarbon radical, Y each is identical or different and is a divalent, optionally substituted hydrocarbon radical, and n is an integer greater than or equal to 1.

10. The process of claim 6, wherein the substantially linear organopolysiloxanes (a1) containing terminal amino groups are siloxanes of the formula $R^6HN-Y-[SiR^1_2O]_nSiR^1_2-Y-NHR^6$ (I)

where $R^1$ each is identical or different and is a monovalent, optionally substituted hydrocarbon radical, $R^6$ each is identical or different and is hydrogen or a monovalent, optionally substituted hydrocarbon radical, Y each is identical or different and is a divalent, optionally substituted hydrocarbon radical, and n is an integer greater than or equal to 1.

11. The process of claim 1, wherein at least one cyclosiloxane is used in preparing the organosilicon compound containing amino groups and Si-bonded hydroxyl groups.

12. The process of claim 3, wherein at least one cyclosiloxane is used as component (a2).

13. The process of claim 1, wherein the equilibration is carried out at a temperature of 60 to 150° C.

14. The process of claim 1, wherein silazane (B) is used in an amount of 0.1 to 10 parts by weight, based on 100 parts by weight of organopolysiloxane (A) containing amino groups and Si-bonded hydroxyl groups.

15. The process of claim 1, wherein the reaction with silazane (B) is carried out at a temperature of 25 to 90° C.

16. The process of claim 1, wherein the organosilicon compounds containing amino groups and Si-bonded hydroxyl groups obtained in step (A) contain from 100 ppm to 5000 ppm by weight of silanol groups.

17. The process of claim 1, wherein the organopolysiloxanes containing amino groups have a silanol content of 0-50 ppm by weight.

18. The process of claim 1, wherein the equilibration catalyst added in step (A) is selected from the group consisting of alkali metal hydroxides, alkali metal alcoholates, quaternary ammonium hydroxides and their hydrates, quaternary phosphonium hydroxides, quaternary ammonium hydroxide silanolates and siloxanolates, quaternary phosphonium silanolates and siloanolates, alkali siloxanolate and ammonium organosiloxanolate salts of linear siloxanediols, phosphorus-nitrogen compounds, and mixtures thereof.

19. The process of claim 1, wherein a distillate obtained from a prior process for preparing organopolysiloxanes containing amino groups, the distillate comprising substantially linear organopolysiloxanes containing terminal SiC-bonded amino groups, at least one cyclic siloxane, and unreacted silazane, is used in step (A).

20. The process of claim 1, wherein the catalyst comprises ammonium chloride, and the silanol content of the product organopolysiloxanes containing amino groups is from 0 ppm to 13 ppm by weight.

* * * * *